United States Patent [19]

Leonard, Jr. et al.

[11] 4,238,579
[45] Dec. 9, 1980

[54] VINYLAMINE AROMATIC COPOLYMERS AND SALTS THEREOF

[75] Inventors: William J. Leonard, Jr., San Francisco; Robert E. Wingard, Jr., Palo Alto, both of Calif.

[73] Assignee: Dynapol, Palo Alto, Calif.

[21] Appl. No.: 40,359

[22] Filed: May 18, 1979

[51] Int. Cl.³ .................. C08F 212/08; C08F 8/12; C08F 220/54

[52] U.S. Cl. .................. 525/330; 428/413; 428/500; 525/121; 525/122; 525/331; 525/332; 525/336; 525/340; 525/344; 525/353; 525/355; 525/374; 525/386; 526/303; 526/310

[58] Field of Search .............. 525/330, 331, 332, 336, 525/344, 353, 355; 526/303, 310

[56] References Cited

U.S. PATENT DOCUMENTS

| | | | |
|---|---|---|---|
| 2,839,516 | 6/1958 | Weisgerber | 526/310 |
| 3,316,224 | 4/1967 | Bestian et al. | 526/303 |
| 3,558,581 | 1/1971 | Beermann et al. | 526/303 |
| 3,715,336 | 2/1973 | Nowak et al. | 526/310 |
| 4,018,826 | 4/1977 | Gless et al. | 526/310 |
| 4,144,388 | 3/1979 | Yatsu et al. | 526/303 |

Primary Examiner—Harry Wong, Jr.
Attorney, Agent, or Firm—William H. Benz

[57] ABSTRACT

Vinylamine copolymers are disclosed. These copolymers have randomly distributed repeating units represented by the formula

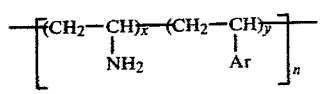

I wherein Ar is optionally substituted phenyl, the substituents independently selected from $C_1$ to $C_6$ alkyl, $C_1$ to $C_6$ alkoxy and halo; x and y are numbers greater than zero which total 1.0, the ratio of x to y from about 0.05:0.95 to about 0.95:0.05; and n is an integer from about 14 to about 10,000. Acid addition salts of these copolymers are also disclosed, as are vinylacetamide/aromatic hydrolysis precursors and the terpolymeric vinylamine/vinylacetamide/aromatic products of partial hydrolysis. The copolymers are useful as epoxy resin-curing agents and as components of protective or decorative coatings.

30 Claims, No Drawings

VINYLAMINE AROMATIC COPOLYMERS AND SALTS THEREOF

FIELD OF THE INVENTION

This invention relates to copolymers of vinylamine. More particularly, this invention relates to copolymers of vinylamine and optionally substituted styrene.

DESCRIPTION OF THE PRIOR ART

Addition copolymerization of certain olefinic polar polymers such, for example, having the group pyridyl with alpha olefins using Ziegler-type coordination catalysts has been disclosed in U.S. Pat. No. 3,761,417. Peroxide catalysis has been found useful for preparing N-vinyl pyrrolidone randomly copolymerized with small amounts of alpha olefinic amines. See U.S. Pat. No. 3,563,968. Weakly basic anion exchange resins based on vinylamine-divinylbenzene copolymers have also been described (Chemical Abstracts, 62, 284 ff). The failure of the literature to disclose the preparation of the more common commercial monomers such as styrene with vinylamine has been regarded as being due primarily to the lack of any economically viable method for introducing vinylamine units. With an attractive commercial process now available, the preparation of copolyvinylamines has become highly desirable.

SUMMARY

In summary, this invention concerns copolymers having randomly distributed repeating units represented by the formula

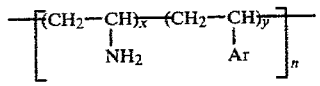

wherein Ar is optionally substituted phenyl, the substituents independently selected from the group $C_1$ to $C_6$ alkyl, $C_1$ to $C_6$ alkoxy and halo; x and y are numbers greater than 0 which total 1.0, the ratio of x to y from about 0.05:0.95 to about 0.95:0.05; and n is an integer from about 14 to about 10,000.

In a further aspect of the present invention, copolymers are disclosed having randomly distributed repeating units represented by the formula

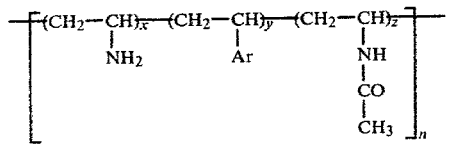

wherein Ar is optionally substituted phenyl, the substituents independently selected from the group $C_1$ to $C_6$ alkyl, $C_1$ to $C_6$ alkoxy and halo; x, y and z are numbers greater than zero which total 1.0; the ratio of (x+z) to y from about 0.05:0.95 to about 0.95:0.05; and n is an integer from about 14 to about 10,000. The copolymers of Formulae I and II are formed by the complete or partial hydrolysis, respectively, of vinylacetamide/aromatic copolymers of general Formula III.

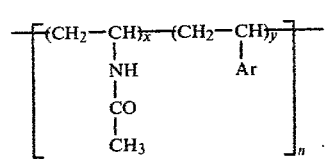

wherein x, y and n have the values previously set forth. These precursor copolymers constitute a further aspect of this invention.

The copolymers of Formula III are prepared by catalytically copolymerizing a mixture of vinyl acetamide with an optionally substituted styrene in bulk or in solution. Complete or partial hydrolysis with a mineral acid of the amide group will produce copoly(vinylamine-optionally substituted styrene) salt. The copolymer can be precipitated from solution at this stage and recovered, or it can be further treated in aqueous media with a base of sufficient strength and amount to maintain the pH of the medium at about 10 or greater. The copolymers of Formula I can be recovered in this manner.

The copolymers of Formula II are prepared by conducting the aforesaid hydrolysis of the copolymer III first formed in the reaction of vinyl acetamide with optionally substituted styrene using conditions inadequate to effect hydrolysis of all of the groups. In yet a further aspect, the copolymers of Formulae I or II or III may be present as the amine acid addition salts, such as the amine hydrochloride and the like.

The copolymers of the present invention can be further treated and, in one aspect of the invention, are used to cure epoxide resins which can have application as, for example, adhesives, impregnants, potting resins, etc. They also may be used as components of protective or decorative coating formulations.

DESCRIPTION OF THE PREFERRED EMBODIMENT

The copolymers of the present invention are generically described by Formulae I, II, and III. The integer n, in Formulae I, II and III, actually an indication of the molecular weight of the copolymers of the present invention, affects the type of use that these materials may enjoy. Thus, in the case of coating systems useful for protecting various metallic or nonmetallic substrates, n is preferably from about 14 to about 1400, most preferably from about 75 to about 750. As curing agents for various epoxy resin systems, the copolymers of the present invention preferably have n in the range of from about 700 to 10,000, most preferably from about 1400 to about 8,000.

The above copolymers of Formula I can be modified not only by varying the ratio of x to y as disclosed hereinbefore, but also by changing the content of free amino groups in the copolymers. Thus, copolymers of the formulae

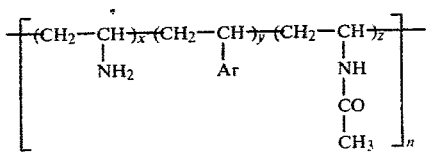

and

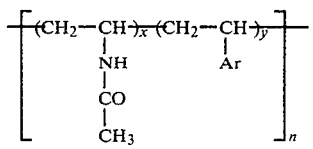

wherein Ar is optionally substituted phenyl, the substituents selected from the group $C_1$ and $C_6$ alkyl, $C_1$ to $C_6$ alkoxy and halo; x, y and z are numbers greater than zero which total 1.0, the ratio of (x+z) to y from about 0.05:0.95 to about 0.95:0.05 and n is an integer from about 14 to about 10,000. In the copolymers of Formula II, number x is generally in the range of 0.05 to 0.90, preferably 0.10 to 0.70. Preferably, the ratio of (x+z) to y is from about 0.25:0.75 to about 0.75:0.25. As in the case of the copolymers of Formula I, the copolymers of Formulae II and III, when used for protective coating applications, have n preferably from about 14 to about 1400, most preferably from about 75 to 750. When used as curing agents, the compounds of Formula II preferably have n from about 700 to 10,000, most preferably 1400 to 8000. In such copolymers, the free amine content can also be varied. That is, the ratio of x to z in Formula II can vary. At one extreme, one finds the hydrolysis starting product which is the vinylalkylamide/comonomer copolymer.

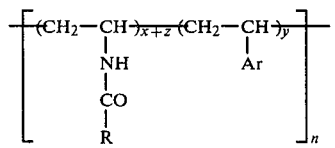

At the other extreme, one finds the total hydrolysis product of Formula I. Thus, x and z can be in the ratio of from 1:0 to 0:1 with ratios of 0.9:0.1 to 0.1:0.9 being preferred.

Little advantage is seen, however, in intentionally forming a terpolymer with only trace amounts of amine or amide present as the terpolymer product's character is essentially that of the other two copolymeric units.

The acid addition salts of the copolymers of Formulae I and II are also further embodiments of the present invention.

The preparation of the copolymers of the present invention is accomplished by reacting acetamidoethylene monomer in bulk or in solution (or dispersion) with optionally substituted styrene comonomer in the presence of a radical initiator. The stoichiometry of the monomer and comonomer employed are in the ratio to 5:95 to 95:5 acetamidoethylene:optionally substituted styrene. While ratios outside of these can also successfully provide copolymers, the properties of the resulting polymers do not differ sufficiently from the pure homopolymer so as to provide significant advantageous properties. Preferably, the above monomers are in the ratio of from about 25:75 to about 75:25. As disclosed above, the reaction may be carried out in bulk or in solution (or in dispersion). When carried out under the latter conditions, two classes of suitable solvents (dispersants) may be used. Polar inert hydrogen bonding liquids are suitable and function as solvent for the monomers and polymer products. These are illustrated by, for example, water and the lower alkanols. Nonpolar inert liquids such as hydrocarbons, ethers, and ketones are also suitable, functioning as monomer solvents, but not as solvents for the polymer, such that the polymer forms a second phase. Lower alkanols of from 1 to 5 carbons such as methanol, isopropanol, tert-butanol and the like are preferred media.

The amount of reaction media is generally selected to provide a concentration of reactant monomers from about 10% to 50% by weight. Lower concentrations could be employed, but are not seen to offer any significant advantage.

A free-radical initiator is employed as catalyst. Suitable catalysts include the organic peroxides and other materials known in the art for this purpose. A commonly available and thus preferred catalyst is AIBN, 2,2-azobis-(2-methylpropionitrile). The amount of catalyst is not critical. Generally, amounts of from 0.5 to 5.0 mol % of catalyst relative to total vinyl equivalents is employed with 1.0 to 2.5 mol % of catalyst being preferred.

The polymerization is carried out at a moderately elevated temperature such as from about 25° C. to about 125° C., with temperatures of from 50° C. to 110° C. being preferred. The polymerization requires from about 2 to 72 hours, and preferably 4 to 48 hours, to complete, depending upon the exact temperature, catalyst, and reactant concentration employed. Generally, the reaction is monitored by NMR, TLC, or gas chromatography for unreacted monomers and continued until no significant monomer remains, for example, less than 5%, preferably less than 1%. The polymer is best recovered by removing the solvent in vacuo. Alternatively, the polymer can be recovered by precipitation in a nonsolvent. Typical nonsolvents include nonpolar organic liquids such as ketones, ethers and hydrocarbons. Suitable nonsolvents include acetone, methylethylketone, methylisobutylketone, diethylether, diisopropylether, hexane, cyclohexane, n-pentane, and the like.

In the next step the copoly(vinylacetamide-optionally substituted styrene) product of Formula III is hydrolyzed to poly(vinylamine-optionally substituted styrene) salt. This hydrolysis is suitably carried out in aqueous media in the presence of a strong acid. To achieve complete hydrolysis at least one equivalent of acid per equivalent of acetamide content of the copolymer should be used, preferably from 1.05 to 3 equivalents of acid per equivalent of acetamide content. Too great an excess of acid can cause the hydrolysis product to precipitate prematurely. Suitable acids include, for example, hydrochloric, sulfuric, p-toluene sulfonic, trifluoroacetic and hydrobromic acids, with hydrochloric and sulfuric acids being preferred. This hydrolysis is carried out at elevated temperatures, such as at the reflux temperature of the solution or temperatures in the range of from about 60° C. to 175° C. and, depending upon the temperature, requires from about 1 hour to about 72 hours, preferably 3 hours to 36 hours, to complete. If partial hydrolysis is desired so as to give the products of Formula II, the reaction should be halted prior to completion.

Following hydrolysis, the polymer salt can be recovered by further acidification and concurrent precipitation. This may be carried out by adding additional acid, cooling, and isolating the precipitated polymer. The precipitated polymer initially is a gum, but, upon drying, forms a granular solid of poly(vinylamine-optionally substituted styrene) salt, such as the hydrochloride salt. The product is the substantially linear repeating unit of the formula

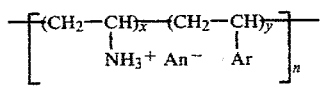

where An is the anion corresponding to the acid employed in the hydrolysis and Ar, x, y and n are previously defined.

The process may be halted at this point, yielding as its product the poly(vinylamine-styrene) salt. It also may be carried further, such as to form the free amine. This conversion may be effected by contacting the salt with an aqueous base such as an alkali metal or alkaline earth metal oxide or hydroxide, at a pH of 10 or greater. Typical useful bases include sodium hydroxide and potassium hydroxide. Other basic materials may be used as well, but are not as economically advantageous. This meutralization may be carried out at temperatures in the range of 15°–50° C., such as at room temperature. This yields the copolymeric free amine which may be isolated and dried, if desired. The polyvinylamine product is a linear polymer. It has a formula

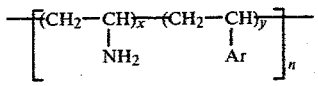 I wherein Ar, x, y and n are as previously defined.

The epoxy resins which can be polymerized with materials of this invention include epoxy compounds and epoxides of the polymeric type and they can be aliphatic, cycloaliphatic, aromatic or heterocyclic, typically having an epoxy equivalency (i.e., the number of epoxy groups contained in the average molecule) of from 1.0 to 6.0, preferably 1 to 3, this value being the number average molecular weight of the epoxide divided by the epoxide equivalent weight. Such epoxide monomers are well known—see "Handbook of Epoxy Resins," by Lee and Neville, McGraw-Hill Company, New York (1967) and "Epoxy Resin Technology," by P. F. Bruins, John Wiley & Sons, Inc., New York (1968).

Particularly useful epoxides which can be used in this invention are those which contain one or more cyclohexane oxide groups such as the epoxycyclohexanecarboxylates, typified by 3,4-epoxycyclohexylmethyl-3,4-epoxycyclohexanecarboxylate, 3,4-epoxy-6-methylcyclohexylmethyl-3,4-epoxy-6-methylcyclohexanecarboxylate, bis(3,4-epoxy-6-methylcyclohexylmethyl) adipate and mixtures thereof as well as mixtures thereof with co-curatives, curing agents, or hardeners which also are well known (see Lee and Neville and Bruins, supra). Representative of the co-curatives or hardeners which can be used are acid anhydrides such as NADIC methyl anhydride, cyclopentanetetracarboxylic dianhydride, cis-1,2-cyclohexanedicarboxylic anhydride, and mixtures thereof. For a more detailed list of useful epoxides of this nature, U.S. Pat. No. 3,117,099 is incorporated herein by reference.

In general, the catalyzed polymerization (cure) of the above epoxide resins can be carried out in accordance with this invention at room temperature (or as low as 0° C. in some cases). In the case of the nonlatent catalysts, elevated temperatures, e.g., 30° to 200° C., preferably 50° to 100° C., can be used to accelerate the cure. In the case of latent catalysts, temperatures generally in the range of 50° to 250° C., preferably from 80° to 150° C., can be used. The particular amount of catalyst to be used and temperature of polymerization will vary, of course, and is dependent on the particular monomers and catalysts used, as well as the particular application to be made.

The curable epoxy composition of this invention can be used to make shaped articles of self-supporting, structural, filled or reinforced epoxy resin composites, such as glass fiber cloth reinforced epoxy resin composites, useful, for example, as repair materials. The various filler and reinforcements and other particulate materials to be mixed or coated with or dispersed in the curable compositions of this invention, as well as methods of processing these materials in maing the composites, and their applications, are those known to the art. In this connection, reference is made to "Modern Composite Materials," edited by Brautman and Krock, published by Addison-Wesley Publishing Company, Reading, Mass. (1967); and "Handbook of Fiberglass and Advances Plastics Composites," edited by G. Lubin, published by Van Nostrand Reinhold Company (1969).

The term "$C_1$ to $C_6$ alkyl" is intended to mean the fully saturated hydrocarbon chains, either linear or branched, containing from 1 to 6 carbon atoms in the chain, "$C_1$ to $C_6$ alkoxy" refers to above alkyl chains, but linked through an oxygen group. The former alkyl groups include, for example, methyl, ethyl, n-propyl, i-propyl, n-butyl, n-hexyl and the like. The latter alkoxy groups are exemplified by methoxy, ethoxy, n-propoxy, i-propoxy, n-butoxy, n-hexyloxy and the like. The term "halo" refers to the halogen groups fluorine, chlorine, bromine and iodine.

As used herein, the phrase "optionally substituted phenyl, the substituents independently selected from the group $C_1$ to $C_6$ alkyl, $C_1$ to $C_6$ alkoxy and halo" encompasses the group phenyl or phenyl substituted with the above defined alkyl, alkoxy and halo groups. When such substitution is present on the phenyl moiety, there may be from 1 to 3 of the substituents present, the substituents preferably being identical.

The term "acid addition salts" is recognized in the art as designating addition salts formed from an organic or inorganic acid. Typical addition salts of the compounds of Formulae I and II include salts with inorganic acids such as hydrochloric acid, hydrobromic acid, sulfuric acid, nitric acid or phosphoric acid; and salts with organic acids such as acetic acid, propionic acid, lactic acid, succinic acid, malic acid, maleic acid, tartaric acid, citric acid, and the like; hydrochloric acid salts are preferred.

A further understanding of the invention can be had from the following nonlimiting Preparations and Examples. As used hereinabove and below, unless expressly stated to the contrary, all temperatures and temperature ranges refer to the centigrade system and the terms ambient or room temperature refer to about 20° C. The term percent or (%) refers to weight percent and the term mole and moles refers to gram moles. The term equivalent refers to a quantity of reagent equal in moles to the moles of the preceding or succeeding reactant recited in that Preparation or Example in the terms of moles of finite weight or volume.

PREPARATION I

A. Preparation of Vinylacetamide

To 462 g of acetamide (technical) is added 12.45 ml of 6 M aqueous sulfuric acid followed immediately by 168 ml (3 moles) of acetaldehyde (99+%). This mixture is stirred and heated until the internal temperature reaches 70° C. (9 minutes). After another minute of heating, the 95° C. clear solution spontaneously crystallizes, causing a temperature rise to 106° C. The reaction product, ethylidene bisacetamide, is not separated. Heating and stirring are continued for another 5 minutes and a mixture of 60 g calcium carbonate (precipitated chalk) and 30 g soft glass powder is added. The resulting mixture is heated to cracking temperature and distilled at 40 mm Hg (200° C. bath temperature). When the internal temperature reaches 160° C. (0.5 hr.), the receiver is changed. After another 1.7 hr., the distillation is almost over, the stirrer is stopped and the heating continued. Slow distillation continues for another hour and is then stopped. The first distillation fraction is 95.9 g of water and acetamide. The second fraction is 466 g of orange oil and crystals. NMR indicates this mixture to contain 195 g vinylacetamide (76% yield), 217 g acetamide, and 54 g ethylidene bisacetamide.

EXAMPLE I

Into a five-liter flask is added 176 g (2.07 mol) of vinylacetamide, 6.60 g (0.04 mol) of AIBN, 215 g (2.07 mol) of styrene, and 2 liters of tert-butyl alcohol. Following deoxygenation, the mixture is heated to 65° C. and there maintained with stirring for 57 hours. This reaction mixture is then reduced to ⅔ volume and added dropwise to 20 liters of acetone. The vinylacetamide-styrene copolymer precipitate is collected and dried in vacuum to yield 376 g (96% yield) of solid copolymer, MW $2.1 \times 10^4$. (Whenever an experimental molecular weight is given herein, it is derived by gel permeation techniques. In the primary technique, a silanized porous glass support is used with a 0.01 M LiBr in DMF eluent. Detection is by refractometer with standardization being based on suitable purchased poly(styrene) or poly(styrenesulfonate) standards.)

Into a two-liter flask is added 100 g of the above solid product (5.50 mequiv amide/g by elemental analysis), 500 ml of methanol and 70 ml (0.84 mol) of 12 N hydrochloric acid to effect hydrolysis of the vinylacetamide units. The mixture is refluxed for about 50 hours. The solvent and excess acid are removed by vacuum treatment and the hydrolyzed polymer dried at 50° C. and 0.1 mm of Hg for 48 hours.

EXAMPLE II

The preparation of Example I is repeated five times. In the first repeat, the mole ratio of vinylacetamide to styrene is changed from 1:1 to 1:2. Upon hydrolysis, a 0.33:0.67. vinylamine/styrene copolymer results.

In the second and third repeats the mole ratio of vinylacetamide to styrene is 3:7 and 3:2.

In the fourth and fifth repeats the degree of hydrolysis is varied by shortening the acid reflux period from 50 hours to 10 and 20 hours, respectively. The feedstock is the 3:7 mole ratio material. The products of these repeats are vinylamine/vinylacetamide/styrene terpolymers. One of these products has a final composition of 0.12:0.18:0.7.

EXAMPLE III

The preparation of Example I is repeated twice with an additional variation. The amount of AIBN polymerization initiator is doubled and halved. This results in final products having lower ($3.5 \times 10^3$) and higher ($6.0 \times 10^3$) molecular weights.

EXAMPLE IV

The preparations of Examples I and II are repeated substituting for styrene, methylvinylbenzene, butylvinylbenzene, and chlorovinylbenzene. Similar products are obtained.

USE OF THE PRODUCTS

Curing Epoxy Resins:

CURING AGENT: A copolymer prepared in accord with Example II with 12 mer % vinylamine residues, 18 mer % vinylacetamide residues, 70 mer % styrene residues. Molecular weight by GPC is 4000 based on polystyrene. The material is a tan solid.

EPOXY RESIN: Dow 331 or Araldite GY 9513.

I.
12.5 mg Dow 331
18 mg curing agent (theoretical-38 mg).
Mix well at room temperature.
Heat at 80° C.
After two hours, the mix becomes clear and hard and adheres to substrates.

II.
12.5 mg GY 9513.
11.7 mg curing agent (theoretical 30 mg).
Mix well at room temperature.
Heat at 80° C.
After two hours, the mix becomes clear and hard and adheres to substrates.

While the present invention has been described with reference to specific embodiments thereof, it should be understood by those skilled in the art that various changes may be made and equivalents may be substituted without departing from the true spirit and scope of the invention. In addition, many modifications can be made to adapt a particular situation, material or composition of matter, process, process step or steps or objective to the spirit of this invention without departing from its essential teachings.

What is claimed:

1. A copolymer consisting essentially of randomly distributed repeating units represented by the formula

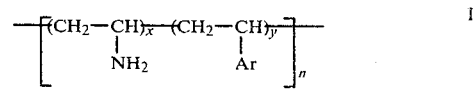

wherein Ar is an aromatic selected from the group consisting of phenyl and phenyl substituted with a member of the group $C_1$ to $C_6$ alkyl, $C_1$ to $C_6$ alkoxy and halo; x and y are numbers greater than zero which total 1.0, the ratio of x to y from about 0.05:0.95 to about 0.95:0.05; and n is an integer from about 14 to about 10,000.

2. The copolymer of claim 1 wherein Ar is the group phenyl.

3. The copolymer of claim 2 wherein n is an integer from about 14 to about 1400.

4. The copolymer of claim 3 wherein n is an integer from about 75 to about 750.

5. The copolymer of claim 4 wherein said ratio is from about 0.75:0.25 to about 0.25:0.75.

6. The copolymer of claim 2 wherein n is an integer from about 700 to about 10,000.

7. The copolymer of claim 6 wherein n is an integer from about 1400 to about 8,000.

8. The copolymer of claim 7 wherein said ratio is from about 0.75:0.25 to about 0.25:0.75.

9. A copolymer consisting essentially of randomly distributed repeating units represented by the formula

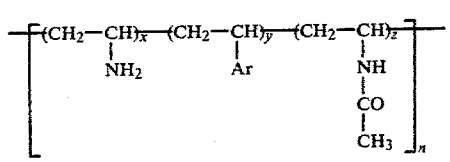

II wherein Ar is an aromatic selected from the group consisting of phenyl and phenyl substituted with a member of the group $C_1$ to $C_6$ alkyl, $C_1$ to $C_6$ alkoxy and halo; x, y and z are numbers greater than zero which total 1.0, the ratio of x to z being from about 0.1:0.9 to about 0.9:0.1; the ratio of (x+z) to y from about 0.05:0.95 to 0.95:0.05, and n is an integer from about 14 to about 10,000.

10. The copolymers of claim 9 wherein Ar is the group phenyl.

11. The copolymer of claim 10 wherein n is an integer from about 14 to about 1400.

12. The copolymer of claim 11 wherein n is an integer from about 75 to about 750.

13. The copolymer of claim 12 wherein said ratio is from about 0.75:0.25 to about 0.25:0.75.

14. The copolymer of claim 9 wherein n is an integer from about 700 to about 10,000.

15. The copolymer of claim 11 wherein n is an integer from about 1400 to about 8000.

16. The copolymer of claim 15 wherein said ratio is from about 0.75:0.25 to about 0.25:0.75.

17. A copolymer consisting essentially of randomly distributed repeating units represented by the formula

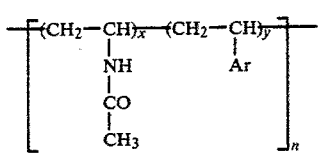

III wherein Ar is an aromatic selected from the group consisting of phenyl and phenyl substituted with a member of the group $C_1$ to $C_6$ alkyl, $C_1$ to $C_6$ alkoxy and halo; x and y are numbers greater than zero which total 1.0, the ratio of x to y from about 0.05:0.95 to about 0.95:0.05; and n is an integer from about 14 to about 10,000.

18. The copolymer of claim 17 wherein Ar is the group phenyl.

19. The copolymer of claim 18 wherein n is an integer from about 14 to about 1400.

20. The copolymer of claim 19 wherein n is an integer from about 75 to about 750.

21. The copolymer of claim 20 wherein said ratio is from about 0.75:0.25 to about 0.25:0.75.

22. The copolymer of claim 18 wherein n is an integer from about 700 to about 10,000.

23. The copolymer of claim 22 wherein n is an integer from about 1400 to about 8000.

24. The copolymer of claim 7 wherein said ratio is from about 0.75:0.25 to about 0.25:0.75.

25. A copolymer consisting essentially of randomly distributed repeating units represented by the formula

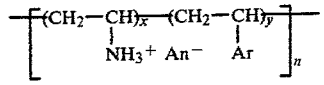

wherein Ar is an aromatic selected from the group consisting of phenyl and phenyl substituted with a member of the group $C_1$ to $C_6$ alkyl, $C_1$ to $C_6$ alkoxy and halo; x and y are numbers greater than zero which total 1.0, the ratio of x to y from about 0.05:0.95 to about 0.95:0.05; and n is an integer from about 14 to about 10,000 and $An^-$ is the anion of a strong acid selected from the group consisting of hydrochloric, sulfuric, p-toluene sulfonic, hydrobromic and trifluoroacetic acid.

26. The copolymer of claim 25 wherein Ar is the group phenyl.

27. The copolymer of claim 26 wherein $An^-$ is an anion of an acid selected from hydrochloric and sulfuric acid.

28. A copolymer consisting essentially of randomly distributed repeating units represented by the formula

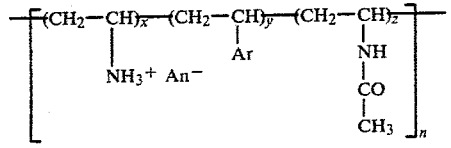

wherein Ar is an aromatic selected from the group consisting of phenyl and phenyl substituted with a member of the group $C_1$ to $C_6$ alkyl, $C_1$ to $C_6$ alkoxy and halo; x, y and z are numbers greater than zero which total 1.0, the ratio of x to 2 being from 0.9:0.1 to 0.1:0.9, the ratio of (x+z) to y from about 0.05:0.95 to 0.95:0.05; and n is an integer from about 14 to about 10,000 and $An^-$ is the anion of a strong acid selected from the group consisting of hydrochloric, sulfuric, p-toluene sulfonic, hydrobromic and trifluoroacetic acid.

29. The copolymers of claim 28 wherein Ar is the group phenyl.

30. The copolymer of claim 29 wherein $An^-$ is an anion of an acid selected from hydrochloric and sulfuric acids.

* * * * *